Jan. 31, 1950 M. CAMRAS Re. 23,192

CONSTANT SPEED DRIVE FOR MAGNETIC RECORDERS

Original Filed Oct. 14, 1942 2 Sheets-Sheet 1

Inventor
MARVIN CAMRAS.
Charles Bell
by Atty.

CONSTANT SPEED DRIVE FOR MAGNETIC RECORDERS

Original Filed Oct. 14, 1942 2 Sheets-Sheet 2

Inventor
MARVIN CAMRAS.
Charles W. Helm
by Atty.

Reissued Jan. 31, 1950

Re. 23,192

UNITED STATES PATENT OFFICE 23,192

CONSTANT SPEED DRIVE FOR MAGNETIC RECORDERS

Marvin Camras, Chicago, Ill., assignor to Armour Research Foundation of Illinois Institute of Technology, a corporation of Illinois Original No. 2,372,810, dated April 3, 1945, Serial No. 461,941, October 14, 1942. Application for reissue January 12, 1949, Serial No. 70,568

7 Claims. (Cl. 179—100.2)

Matter enclosed in heavy brackets [ ] appears in the original patent but forms no part of this reissue specification; matter printed in italics indicates the additions made by reissue

This invention relates to improvements in a constant speed drive for a magnetic recorder, wherein reproduction of sound is made upon a wire, tape, or similar elongated member and magnetizes the member as it travels in accordance with the varying sound waves emanating from voices or instruments during lectures, plays, concerts, or various other types of productions.

While the instant invention is highly desirable for use in connection with magnetic recording devices of a very high fidelity type, it will be appreciated that the invention may also be used with such recording devices giving lesser fidelity and still provide a great advantage by its use.

In magnetic recording instruments utilizing a wire upon which a recording is made, the paramagnetic wire is usually of a size approximating a human hair, and this wire is customarily wound back and forth between a pair of reels. The wire will travel in one direction during a recording, and is rewound in the reverse direction, and again travels forward during the reproduction of that recording. If there is any over-run, unexpected variance in speed, or slippage of the wire during its travel, the recording is adversely affected, or, if the recording has been good, then the reproduction of that good recording will be adversely affected. For best reproduction results, it is necessary for the wire to travel at the same speed during a reproduction as the wire travels during the making of a recording, and if the wire travels more rapidly near the later portion of the recording than it did at first, due to variance in circumference of wire upon the reels, the same relative speed will be present during the reproducing of that recording. Over-run, slippage, or unexpected variations in speed, either during recording or reproduction of a recording, should be eliminated in order to insure fidelity.

I am aware that in the past many and various constant speed drive arrangements for an elongated flexible member have been developed, but insofar as I am aware those drives have been developed for much heavier elements than a wire of the approximate size of a human hair, and when dealing with such a fine article the maintenance of constant speed and the elimination of over-run and slippage provides a difficulty which magnifies as the traveling element becomes smaller in size.

With the foregoing in mind, it is an important object of this invention to provide a driving arrangement for a magnetic recorder utilizing an elongated recording medium of very small size, which driving arrangement insures the recording medium moving around at a predetermined constant speed, without any over-run, unexpected speed variances, or slipping.

It is also an object of this invention to provide a constant speed driving arrangement for a magnetic recorder, in which the driving arrangement not only maintains the speed constant during the actual recording upon a wire or other elongated element, but also tends to maintain the speed constant against overrun and slippage both before and after the actual recording.

Still another feature of this invention is the provision of a constant speed drive for a magnetic recorder which is designed not only to maintain the travel of the recording medium at a predetermined speed, without unexpected variations or slippage, but also to maintain a predetermined tension upon the recording medium at all times so as to eliminate any lost motion effect upon reversal of the recording medium.

Also a feature of this invention is the provision of a constant speed driving arrangement for a magnetic recording device, in which the driving arrangement is extremely economical, highly efficient, can be readily incorporated in a magnetic recorder, and needs little if any attention thereafter.

While some of the more salient features, characteristics and advantages of the instant invention have been above pointed out, others will become apparent from the following disclosures, taken in conjunction with the accompanying drawings, in which.

As shown on the drawings.

Figure 1:
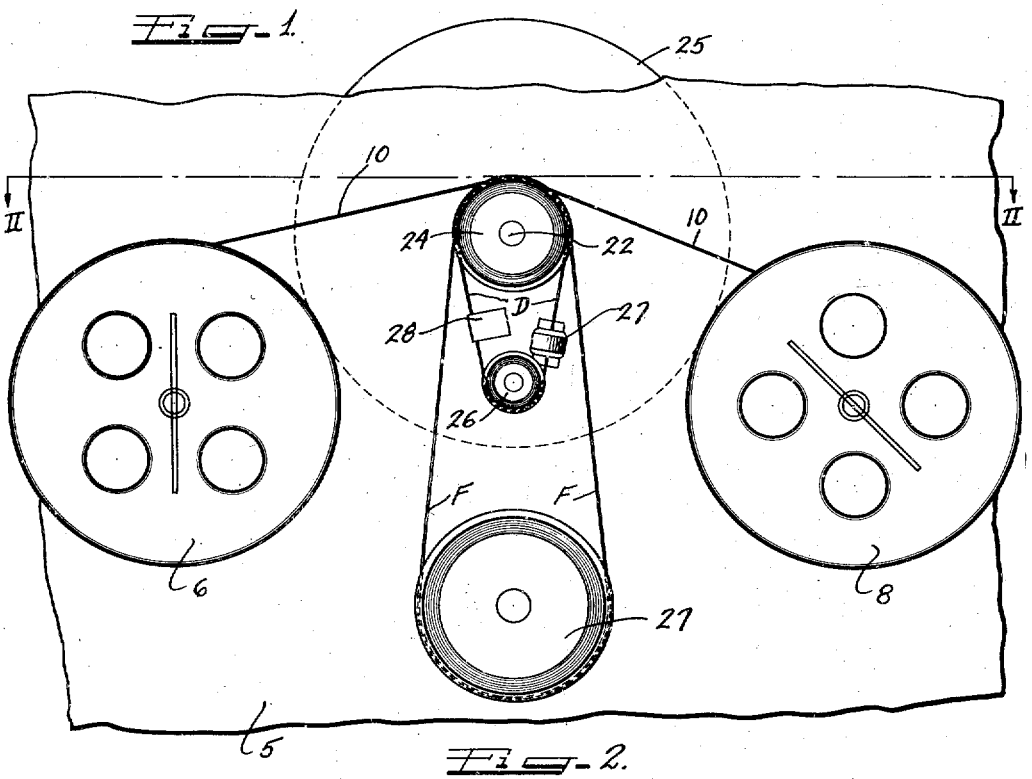
Figure 1 is a fragmentary front elevational view of a magnetic recording device embodying a constant speed drive arrangement involving principles of the instant invention.

In the illustrated embodiment of this invention, there is shown a panel 5 which may be a portion of any suitable housing, cabinet, or other supporting structure. Near one side of the panel 5 is a pulley 6 mounted on a suitable shaft 7 journaled in the panel. Likewise, near the opposite side of the panel, a similar pulley 8 is mounted on a rotatable shaft 9. A recording medium 10, which in the illustrated instance is in the form of a fine round wire of paramagnetic material and approximately .004 or .005 inch in diameter, is carried on these spools and may be wound back and forth between the spools in either direction. Suitable means, not shown in the drawings, may be utilized to prevent unintentional complete winding of the wire off one of the spools.

The pulley reel 8 may be driven by any suitable means to move the wire 10 forwardly, that is, off reel 6 and onto reel 8. Such drive takes effect through a suitable gear 11 carried on a shaft 12 mounted in a suitable frame 13 on the back of the panel 15. A slip clutch arrangement imparts a drive from shaft 12 to the aforesaid shaft 9 carrying the reel 8. This slip clutch arrangement includes a disk 14 on the inner end of the shaft 12 carrying a suitable facing 15, and a disk 16 on the inner end of the shaft 9 for engagement with the facing 15. Of course, the disk 14 and the facing 15 are slidably mounted on the shaft 12, as well as rotating with the shaft, and the clutch elements are maintained in continuous contact with each other by a suitable spring 17 or equivalent means.

Figure 2:
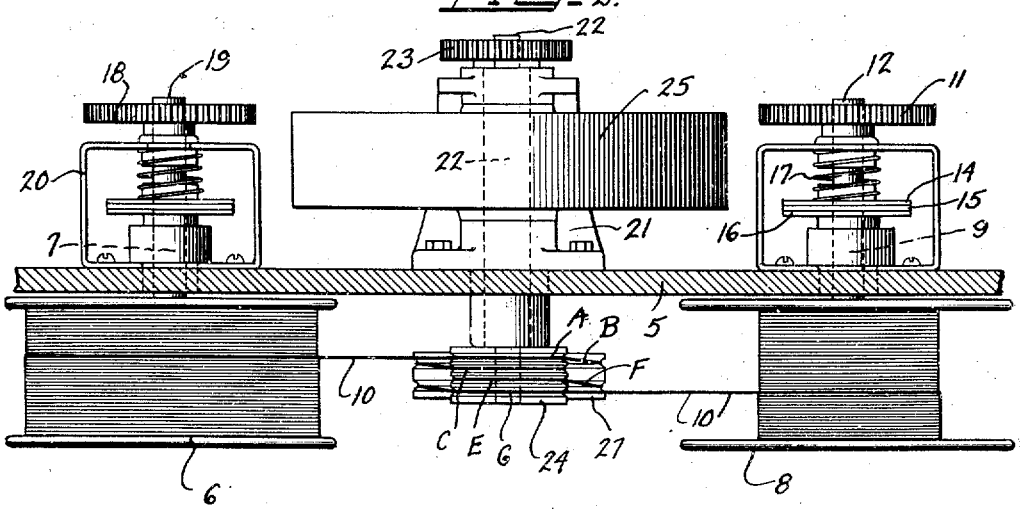
Figure 2 is a fragmentary plan sectional view taken substantially as indicated by the section line II—II of Figure 1, looking in the direction of the arrows.

The reel or spool 6 may be driven counterclockwise as viewed in Figures 1 and 2 to effect a rewinding of the wire 10 in the reverse direction, namely, off reel 8 and onto reel 6. This drive is effected from any suitable means through a gear 18 on a shaft 19 carried in a suitable subframe 20 mounted on the back of the panel 5, and the drive is effected through a slip clutch arrangement identical with that previously described in connection with the drive from shaft 12 to reel 8.

It will be appreciated that any suitable form of driving mechanism can be utilized to actuate the gears 11 and 18, and the corresponding shafts 12 and 19. One form of device for this purpose would be a suitable reversing motor so that when shaft 12 is driven to actuate reel 8 in a clockwise direction, there is no drive on reel 6, that reel merely idling, and likewise, when reel 6 is driven positively in a counterclockwise direction, there is no drive on reel 8, which merely idles. If, however, nothing else was utilized in order to move the wire from one reel to the other, slippage of the wire might occur, overrunning of the wire might occur due to the frequent stops, reversals of direction and starts, and there may be unexpected variances of speed in the wire for various reasons. This would interfere with high fidelity recording and also interfere with reproduction, even though the recording may have been perfect. If slippage or unexpected variances of speed occurred both during the recording, and later during the reproduction from that recording, then the defects in high fidelity reproduction are magnified.

To this end, a constant speed drive arrangement is incorporated, and for better advantage, this drive arrangement takes effect upon the wire 10 between the heels 6 and 8. This drive arrangement includes a suitable frame and bearing carrying structure 21 which may be mounted on the back of the panel 5. A shaft 22 extending through the panel carries on its inner end a driving gear 23, and on its outer or front end a pulley 24 provided with a plurality of grooves, in the illustrated instance there being four grooves. This shaft may be driven in either direction by the reversing motor (not illustrated) above mentioned or any other suitable form of driving means through the gear 23. In the intermediate portion thereof, the shaft 22 carries a relatively heavy flywheel 25 to insure smooth operation.

Mounted on the panel 5 a distance below, preferably in vertical alignment with the aforesaid pulley 24, is another free-running single-track pulley 26 of smaller size than the pulley 24. Also mounted on the panel 5 between the pulleys 24 and 26 is a demagnetizing or erasing head 27 and a magnetizing or recording head 28. The erasing head and the recording head are positioned in any feasible location for the wire 10 to pass therethrough in its travel from one reel to the other. Disposed a distance below the pulley 26, but also preferably in vertical alignment with both pulley 26 and pulley 24, is a larger pulley 27 which, in the instant illustration, is provided with a double-track or groove. This pulley 27, like the pulley 26, is a free-running pulley mounted on a stub-shaft in the front panel 5.

The wire or recording medium 10 is trained over the three pulleys 24, 26 and 27 in a manner to insure a clean positive movement of the wire, without over-run, slippage, or unexpected variances in speed. The wire extends from the reel 6 over the pulley 24, downwardly around the pulley 27, again over the pulley 24, downwardly around the pulley 26, passing through both the erasing head 27 and the recording head 28 in this loop, thence again over the pulley 24, down and around the pulley 27, over the pulley 24 and to the reel 8. This particular travel of the wire is best illustrated diagrammatically in Figure 3. It will there be seen that the wire makes a turn A around the inner groove of the driven pulley 24 and then takes a loop B around the large idler pulley 27, turns over the second groove of the driven pulley 24 as indicated at C, then takes a shorter loop D around the smallest pulley 26, returns again around the third groove of the pulley 24 as indicated at E, takes another loop F around the second groove of the largest pulley 27, passes around the fourth groove of the pulley 24 as indicated at G, and then travels onto the reel 8. As the wire passes downwardly to the small idler pulley 26, it passes through the erasing head 27, and as it rises upwardly from this pulley 26, it passes through the recording head 28.

It will be noted that due to the larger diameter of the pulley 27 over the driven pulley 24, the first loop B will provide a greater bight around the pulley 27, and the intermediate loop D around the idler pulley 26 which is much smaller in diameter than the driven pulley 24 will create a much greater bight or grab around the driven pulley 24 in that loop of the wire during which the wire travels through the erasing and recording heads 27 and 28, respectively. Following this loop, there is still another larger loop F around the large pulley 27. From this arrangement it will be noted that there can be no over-run, slippage, or unexpected variances in speed of the wire, and this is especially true during the time the wire passes through the erasing and recording heads. A tension is also kept upon the wire in the direction of its travel, in addition to the tension inherently placed upon the wire by virtue of its repeated travel around the several pulleys. As stated above, if the wire is traveling from the reel 6 to the reel 8, the reel 8 will be driven through the gear 11. The gear 11 and likewise the shaft 12 are preferably driven at a slightly higher rate of speed than the driven pulley 24, thus tending to rotate the reel 8 at a rate faster than the wire is being delivered to the reel. A tension is thereby placed upon the wire between the reel 8 and the driven pulley 24, and any undue effect from such tension is offset by the slipping of the slip clutch arrangements 14, 15 and 16.

In the event the wire is traveling from the reel 8 to the reel 6, the gear 18 and shaft 19 are likewise driven at a slightly faster rate of speed than the driven pulley 24 which will then be operating in the reverse direction, and the same result is obtained. When either the reel 6 or the reel 8 is being driven, the other reel is idling.

Figure 4:
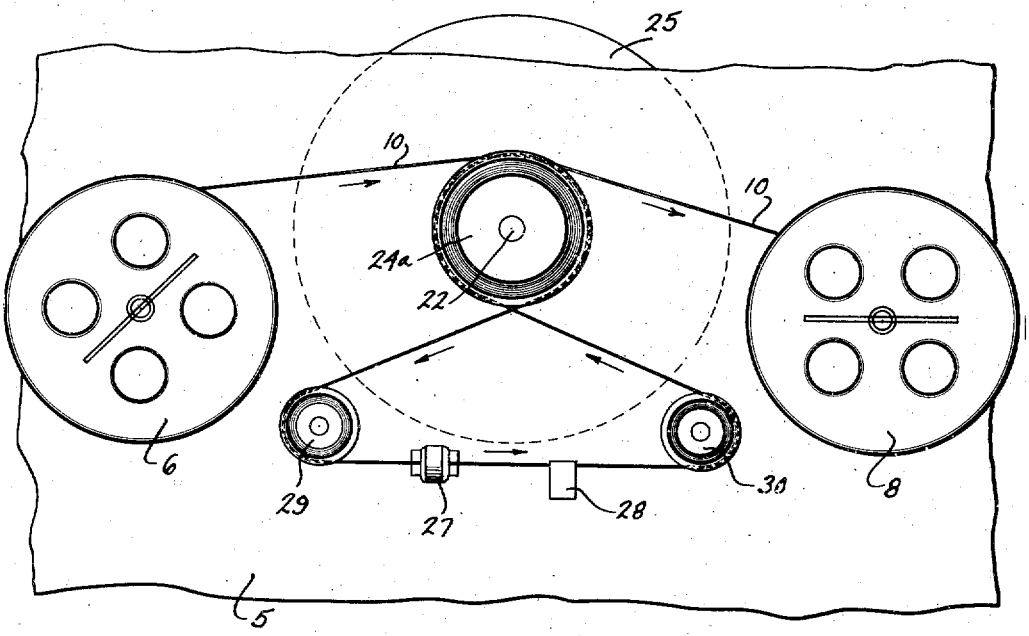
Figure 4 is a fragmentary front view, similar in character and location to Figure 1, but illustrating a more economical and modified form of constant speed drive.
Figure 3:
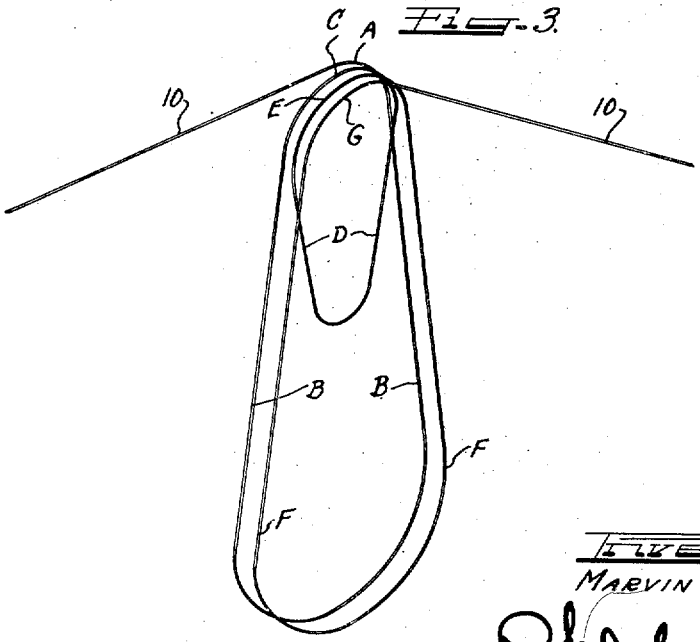
Figure 3 is a fragmentary diagrammatic view of the recording medium alone, illustrating the path of travel of this medium through the constant speed drive arrangement of Figures 1 and and 2.

In Figure 4, I have illustrated a more economical form of constant speed driving arrangement which, while probably not as effective as the arrangement described in connection with Figures 1, 2 and 3, is somewhat more economical and is highly desirable for use on less costly magnetic recorders and on magnetic recorders where such high fidelity as that provided in the machine of Figures 1, 2 and 3 may not be necessary. The arrangement in Figure 4 will, however, increase the fidelity of the recorder of Figure 4 insofar as it is possible to do so by holding the wire at a constant speed and eliminating slippage, over-run, and unexpected variances in speed.

In the instance of Figure 4, the same front panel is shown with the reels 6 and 8 mounted in the same manner. These reels are driven one at a time as above explained. Likewise, the drive shaft 22 equipped with a flywheel 25 also functions in the manner as above described. In this case, however, the shaft 22 carries on its outer end a driven pulley 24*a* which need have but two grooves therein. The wire 10 leaves the reel 6, passes half around one of the grooves in the driven pulley 24*a*, returns obliquely in the reverse of its original direction, and passes over an idler pulley 29, then travels from the idler pulley 29 in a direction paralleling its original course to another idler pulley 30, passes half around the idler pulley 30, back in an obliquely reversed direction, to the other groove in the pulley 24*a*, and then leaves toward the reel 8. As indicated by the small arrows adjacent the wire in Figure 4, it will be seen that the wire makes a loop around the small idler pulleys 29 and 30 and criss-crosses between these idler pulleys and the driven pulley 24*a*, the three pulleys forming in effect a triangular path of travel. By virtue of the criss-cross arrangement, there is created an added grab or bight around the driven pulley both in the initial passage of the wire and the subsequent passage of the wire around this pulley which will eliminate over-run, slippage, and variances in speed. The wire may pass through the erasing head 27 and the recording head 28 in its lower horizontal line of travel between the pulleys 29 and 30. The position of the erasing head and recording head are reversed in Figure 4 from the showing in Figure 1 because it is necessary for the wire in traveling from reel 6 to reel 8 to pass through the erasing head prior to its passage through the recording head, because frequently one recording is made on top of another one, and it is essential that the first recording be removed from the wire by a demagnetization process before the wire is magnetized for the new recording. As in the previous case, each of the reels 6 and 8, when driven, tends to rotate at a faster rate than the driven pulley 24*a* so as to maintain a tension on the wire, which tension is prevented from becoming unduly effective by the slip clutch connection above described.

From the foregoing, it is apparent that I have provided novel means for association with a magnetic recorder, which means will positively prevent slippage of the recording medium, over-run, or unexpected variances in speed, the travel of the recording medium being held at an even steady rate while a recording is being made or a reproduction is being made from a previous recording. It will be appreciated that the invention is easily embodied within a magnetic recorder, is economical, highly effective and highly durable and distinctly improves the fidelity of the recorder with which it is associated.

It will be especially noted that with either of the drive arrangements shown and described herein, knots or splices in the recording medium will freely follow the prescribed course of travel without binding or snagging at any point in their travel. It should also be carefully noted that the loops of recording medium around the constant speed arrangement are controlled as to speed entirely by the flywheel 25.

*The term "loop" as used herein refers to a passage of the record medium over one member, then around a second, and then back over the first member again, or to a passage of the record medium over the first member, then over a plurality of additional members successively, and then back over the first member again.*

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

[1. In a magnetic recording device wherein sound is recorded by magnetizing an elongated recording medium, a pair of spaced reels, a recording medium on said reels to travel from one to the other, and a constant speed drive arrangement including a plurality of pulleys over which said medium passes in its travel from one reel to the other, said pulleys all having their centers in alignment but being of different diameters.]

[2. In a magnetic recording device wherein sound is recorded by magnetizing an elongated recording medium, a pair of spaced reels, a recording medium on said reels to travel from one to the other, and a constant speed drive arrangement including a plurality of pulleys over which said medium passes in its travel from one reel to the other, one of said pulleys being driven and the remainder being idlers, one of said reels being driven at a faster speed than said driven pulley, said medium running from said driven pulley to said driven reel, and a slip-clutch arrangement in the drive for said reel.]

3. In a magnetic recording device wherein sound is recorded by magnetizing an elongated recording medium, a pair of spaced reels, a recording medium on said reels to travel from one to the other, a slip-clutch driving connection for each of said reels, and a constant speed drive arrangement between said reels including a driven pulley from which said medium extends to each reel, and a series of idler pulleys with each of which and the driven pulley said medium makes a *separate* loop.

[4. In a magnetic recording device wherein sound is recorded by magnetizing an elongated recording medium, a pair of spaced reels, a recording medium on said reels to travel from one to the other, and a series of pulleys of different sizes between said reels, said medium passing from a certain one of said pulleys to each of said reels and forming a loop around said certain pulley and each other pulley in the series.]

5. In a magnetic recording device wherein sound is recorded by magnetizing an elongated recording medium, a pair of spaced reels, a recording medium on said reels to travel from one to the other, and a series of three pulleys of different sizes between said reels, the medium passing to each reel from the intermediately sized pulley and making a plurality of loops around said intermediate pulley and the largest pulley and a central loop around the intermediate pulley and the smallest pulley.

6. In a magnetic recording device wherein sound is recorded by magnetizing an elongated recording medium, a pair of spaced reels, a recording medium on said reels to travel from one to the other, a series of three pulleys of different sizes between said reels, the medium passing to each reel from the intermediately sized pulley and making a plurality of loops around said intermediate pulley and the largest pulley and a central loop around the intermediate pulley and the smallest pulley, and recording means acting on said medium during its travel through said central loop.

7. In a magnetic recording device wherein sound is recorded by magnetizing an elongated recording medium, a pair of spaced reels, a recording medium on said reels to travel from one to the other, a constant speed drive arrangement, including a triangular arrangement of pulleys between said reels, said medium passing around said pulleys in a manner to form a criss-cross path within the triangular formation of the pulleys.

*8. In a magnetic recording device wherein sound is recorded by magnetizing an elongated recording medium, a pair of spaced reels, a recording medium on said reels to travel from one to the other, and a constant speed drive arrangement including a plurality of pulleys over which said medium passes in its travel from one reel to the other, one of said pulleys being driven and the remainder being idlers, one of said reels being driven at a faster speed than said driven pulley, said medium running from said driven pulley to said driven reel, a slip-clutch arrangement in the drive for said reel, said medium being wrapped around at least a portion of said driven pulley at least two successive times in passing from one reel to the other, and recording means acting on a reach of medium between said driven pulley and said idler pulley.*

*9. In a magnetic recording device wherein sound is recorded by magnetizing an elongated recording medium, a pair of spaced reels, a recording medium on said reels to travel from one to the other, and a constant speed drive arrangement including a plurality of pulleys over which said medium passes in its travel from one reel to the other, one of said pulleys being driven and the remainder being idlers, one of said reels being driven at a faster speed than said driven pulley, said medium running from said driven pulley to said driven reel, a slip-clutch arrangement in the drive for said reel, said medium passing over said driven pulley then over at least one idler and then again over said driven pulley as it passes from one reel to the other, and recording means acting on a reach of medium between said idler and said driven pulley.*

*10. In a magnetic recording device wherein sound is recorded by magnetizing an elongated recording medium, a pair of spaced reels, a recording medium on said reels to travel from one to the other, and a constant speed drive arrangement including a plurality of pulleys over which said medium passes in its travel from one reel to the other, one of said pulleys being driven and the remainder being idlers, one of said reels being driven at a faster speed than said driven pulley, said medium running from said driven pulley to said driven reel, a slip-clutch arrangement in the drive for said reel, said driven pulley having a pair of laterally spaced grooves in the periphery thereof, said medium passing over said driven pulley in one of said grooves, then over at least one of said idler pulleys, and then again over said driven pulley in the other of said grooves as it passes from one reel to the other, and recording means acting on a reach of medium between said idler and said driven pulley.*

MARVIN CAMRAS.

REFERENCES CITED

The following references are of record in the file of this patent:

UNITED STATES PATENTS

| Number | Name | Date |
|---|---|---|
| 1,758,559 | Croll | May 13, 1930 |
| 1,917,509 | Ybarrondo | July 11, 1933 |
| 2,215,468 | Herzig | Sept. 24, 1940 |
| 2,251,322 | Buhrendorf | Aug. 5, 1941 |

FOREIGN PATENTS

| Number | Country | Date |
|---|---|---|
| 645,623 | France | Oct. 29, 1928 |